M. F. PANE.
SALT AND PEPPER SHAKER.
APPLICATION FILED NOV. 4, 1909.
975,451.
Patented Nov. 15, 1910.
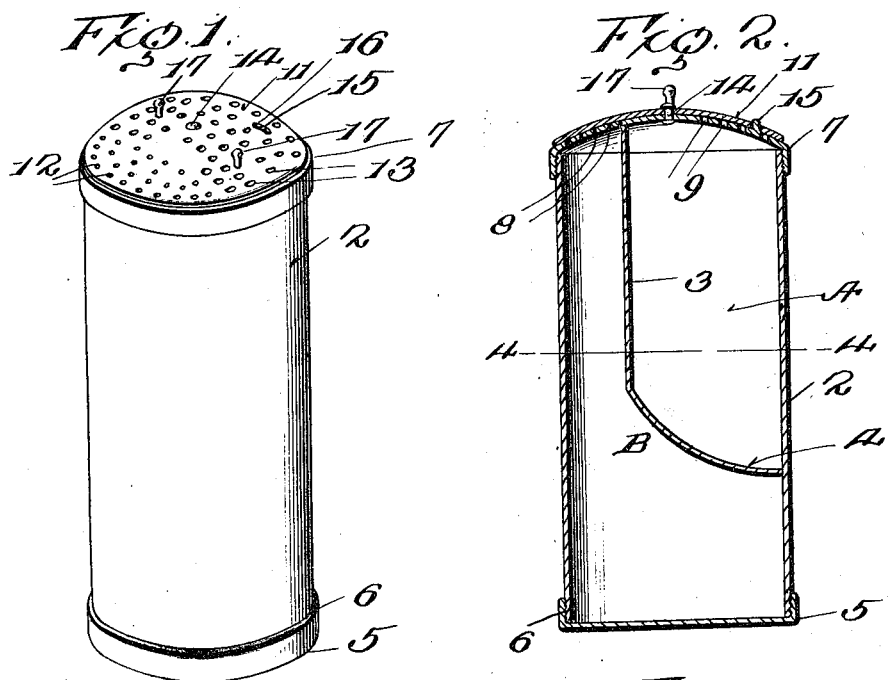
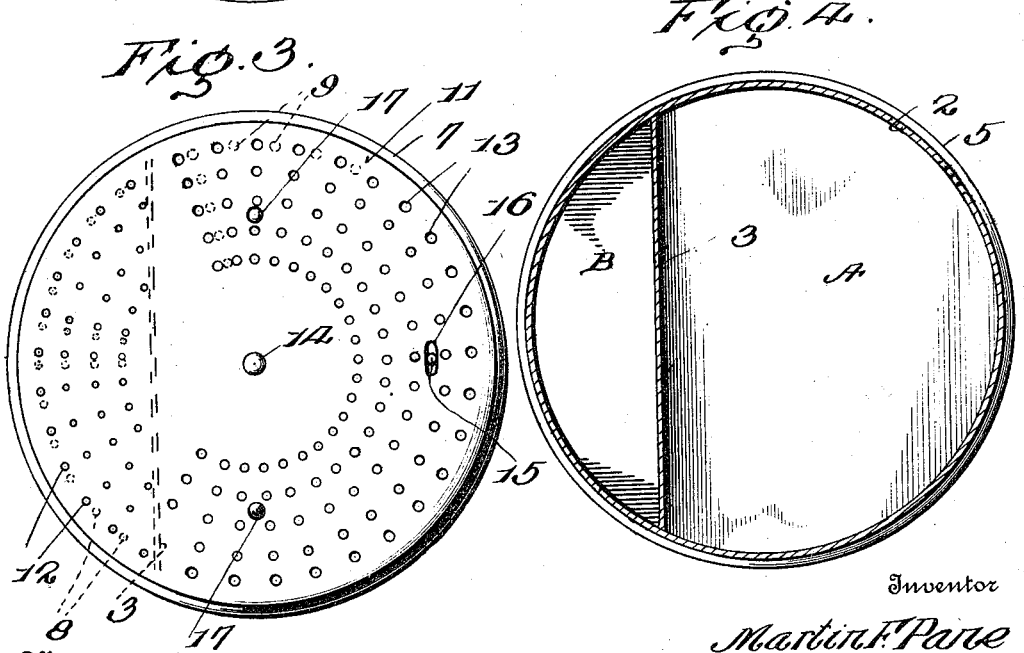
Witnesses
W. A. Woodson,
Juana M. Fallin,
Inventor
Martin F. Pane
By
Attorneys

UNITED STATES PATENT OFFICE.

MARTIN F. PANE, OF MURDOCKSVILLE, PENNSYLVANIA.

SALT AND PEPPER SHAKER.

975,451.  Specification of Letters Patent.  Patented Nov. 15, 1910.

Application filed November 4, 1909.  Serial No. 526,235.

*To all whom it may concern:*

Be it known that I, MARTIN F. PANE, a citizen of the United States, residing at Murdocksville, in the county of Washington and State of Pennsylvania, have invented certain new and useful Improvements in Salt and Pepper Shakers, of which the following is a specification.

My invention relates to utensils for holding both salt and pepper or like condiments, and the object of the invention is to provide a receptacle in the form of a shaker, divided into compartments, one for the salt and the other for the pepper, one of the compartments having a filler opening at the top, while the other of the compartments has a filler opening at the bottom, both of the compartments having discharge openings, however, at one end, the discharge end of the receptacle being controlled by the usual perforated plates, one of which is rotatable with relation to the other, and both being provided with registerable holes, means being also provided for limiting the rotation of one plate relative to the other.

For a full understanding of the invention and the merits thereof, and to acquire a knowledge of the details of construction, reference is to be had to the following description and accompanying drawing, in which:

Figure 1 is a perspective view of my device; Fig. 2 is a vertical section thereof; Fig. 3 is an enlarged top view; and, Fig. 4 is an enlarged transverse section on the line 4—4 of Fig. 2.

Corresponding and like parts are referred to in the following description and indicated in all the views of the drawing by the same reference characters.

Referring to these figures, 2 designates a receptacle having the general form usual in salt shakers. The interior of the receptacle is divided into two unequal portions by a transverse partition 3. The lower end of the partition 3 or wall extends preferably at an incline across to the opposite wall, as at 4, this wall 3 and 4 thus dividing the shaker into two compartments of unequal size, the compartment A being used for salt and the compartment B for pepper. It will be seen that the compartment B opens at the bottom of the receptacle 2. The receptacle 2 is screw-threaded, as at 6, at its lower end for engagement with the flanges of a bottom 5. This bottom 5 may be thus unscrewed to permit pepper or like condiment to be filled into the compartment B. It will be seen that the inclined bottom wall 4 of the partition permits the pepper to flow down into the contracted portion of the compartment B when the receptacle is inverted.

The upper end of the receptacle 2 is closed by a removable cover 7, this cover being preferably screw-threaded or otherwise detachably connected with the upper end of the receptacle. The cover is perforated with two sets of holes 8 and 9. The holes 8 are relatively small and are over the pepper compartment B, while the holes 9 are larger than the holes 8 and are over the salt compartment. Rotatably mounted upon the cover plate 7 is a disk 11 which is attached to the plate 7 by a central rivet or other fastening 14. The disk 11 is formed with two series of holes 12 and 13, the holes 12 being of small diameter, and the holes 13 being of larger diameter. The holes 12 and 13 are so arranged relative to each other that when the plate 11 is turned to its full extent in one direction, then the holes 12 will register with the holes 8, while, when it is turned to its full extent in the other direction, the holes 13 will register with the holes 9, and that when the disk 11 is turned to a median position, neither set of holes will register with the perforations in the plate 7, and the disk 11 therefore acts as a closure so that neither pepper nor salt can be shaken from the receptacle. The plate 7 is formed with a slot 16, and projecting through this slot is a pin 15 formed with the cover plate 7. The disk 11 is also provided with the upwardly projecting studs or handles 17, whereby the disk may be easily rotated.

The use of my invention will be obvious. Turned half way, the disk 11 prevents the ejection of either salt or pepper. Turned to its full extent in one direction, it permits the pepper to be cast out, and in the other direction, permits the salt. The salt compartment may be filled by unscrewing the cover 7, while the pepper compartment is filled by unscrewing the bottom 5. The advantage of the removable bottom, in combination with a pepper compartment that extends down to the bottom, is that it gives a large filling opening for the pepper compartment and prevents any chance of the salt becoming contaminated with pepper, as would be the case if an attempt were made to fill pepper into the receptacle at the relatively small opening of the pepper compartment.

The utensil is extremely handy and useful, in that the user has both a pepper and a salt shaker in one article. The salt shaker does not, however, have to be put down in order to use the pepper shaker, nor will the pepper shaker be lost while the salt shaker is in use.

Having thus described the invention, what I claim is:

A utensil of the character described, comprising a cylindrical receptacle open at both ends, said receptacle having a partition wall extending across the receptacle to one side of its center, the lower end of said wall about the middle of the receptacle being outwardly and downwardly inclined, thus dividing the receptacle into two unequal compartments, one of which has a contracted upper end and an enlarged lower end, the other of which is equal in cross sectional area through its whole extent, a screw-cover for the lower end of the receptacle and forming a closure for the compartment having the contracted upper end, a screw-cover for the upper end of the receptacle extending over and forming a closure for both of the compartments, said cover being provided with two sets of perforations, one set of relatively small diameter being located over the upper end of the compartment having the contracted upper end, the other set of relatively large perforations being located over the other of said compartments, and a disk mounted on the cover and having two sets of perforations, one set adapted to register with the small perforations when the disk is turned in one position, and the other with the large perforations when the disk is turned into the other position.

In testimony whereof I affix my signature in presence of two witnesses.

MARTIN F. PANE. [L. S.]

Witnesses:
J. F. KERR,
BEN L. BENNETT.